(12) United States Patent
Generazio (10) Patent No.: US 8,108,178 B2
(45) Date of Patent: Jan. 31, 2012

(54) DIRECTED DESIGN OF EXPERIMENTS FOR VALIDATING PROBABILITY OF DETECTION CAPABILITY OF A TESTING SYSTEM

(75) Inventor: Edward R. Generazio, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 352 days.

(21) Appl. No.: 12/467,475

(22) Filed: May 18, 2009

(65) Prior Publication Data
US 2010/0122117 A1    May 13, 2010

Related U.S. Application Data

(60) Provisional application No. 61/053,694, filed on May 16, 2008, provisional application No. 61/109,531, filed on Oct. 30, 2008, provisional application No. 61/158,868, filed on Mar. 10, 2009.

(51) Int. Cl.
G06F 19/00        (2006.01)
G06F 11/30        (2006.01)

(52) U.S. Cl. .......... 702/179; 702/81; 702/182; 717/124

(58) Field of Classification Search .............. 702/81, 702/179, 182; 700/79, 245; 714/26, 35, 714/39; 717/124
See application file for complete search history.

(56) References Cited

U.S. PATENT DOCUMENTS

| 6,157,699 | A | 12/2000 | Dunn |
| 6,195,624 | B1 | 2/2001 | Woodman et al. |
| 6,799,145 | B2 * | 9/2004 | Kennedy et al. ............... 702/182 |
| 7,155,369 | B2 | 12/2006 | Papadimitriou et al. |
| 7,333,648 | B2 | 2/2008 | Edic et al. |
| 7,403,871 | B2 | 7/2008 | Papadimitriou et al. |
| 7,490,319 | B2 * | 2/2009 | Blackwell et al. ............. 717/124 |
| 7,917,895 | B2 * | 3/2011 | Givoni et al. .................. 717/124 |
| 2006/0010426 | A1 * | 1/2006 | Lewis et al. ..................... 717/124 |
| 2008/0183402 | A1 | 7/2008 | Malkin et al. |

OTHER PUBLICATIONS

Yee et al., Assessment of NDE Reliability Data, Final Report, Jul. 1974-Sep. 1975 (General Dynamics/Fort Worth and Vanderbilt University, Nashville, Tennessee) NASA-CR-134991.

Ward D. Rummel, Recommended Practice for Demonstration of Nondestructive Evaluation (NDE) Reliability on Aircraft Production Parts, Materials Evaluation, vol. 40, Aug. 1982.

(Continued)

Primary Examiner — John H Le
(74) Attorney, Agent, or Firm — Thomas K. McBride, Jr.; Robin W. Edwards (57) ABSTRACT

A method of validating a probability of detection (POD) testing system using directed design of experiments (DOE) includes recording an input data set of observed hit and miss or analog data for sample components as a function of size of a flaw in the components. The method also includes processing the input data set to generate an output data set having an optimal class width, assigning a case number to the output data set, and generating validation instructions based on the assigned case number. An apparatus includes a host machine for receiving the input data set from the testing system and an algorithm for executing DOE to validate the test system. The algorithm applies DOE to the input data set to determine a data set having an optimal class width, assigns a case number to that data set, and generates validation instructions based on the case number.

18 Claims, 6 Drawing Sheets

OTHER PUBLICATIONS

Standard NDE Guidelines and Requirements for Fracture Control Programs, MSFC-STD-1249, National Aeronautics and Space Administration, Sep. 1985.

NASA-STD-5009, Nondestructive Evaluation Requirements for Fracture C cal Metallic Components, Apr. 7, 2008.

Mil-Handbook-1823, Nondestructive Evaluation System Reliability Assessment, Apr. 30, 1999.

Edward R. Generzaio, "Design of Experiments for Validating Probability of Detection Capability of Nondestructive Evaluation Systems and Qualification of Inspectors (DOEPOD)" Quality Leadership Forum, KSC, Mar. 18-19, 2009.

Edward R. Generazio, "Nondestructive Testing for Mission Assurance", NDE/NDT for Highways and Bridges: Structural Materials Technology (SMT) 2008, Oakland, CA Sep. 8-12, 2008.

Edward R. Generazio, "Directed Design of Experiments for Validating Probability of Detection Capability of NDE Systems (DOEPOD)", 34th Annual Review in Quantitative Nondestructive Evaluation, Jul. 2007.

\* cited by examiner

| | Is 90/95 POD at $X_{pod}$ reached? (i.e., lower confidence bound, $X_{Best\_LCL}$ is equal to or greater than 0.9) 74 | Does $X_{POH=1}$ Exist 75 | Is $POH = 1$ everywhere greater than $X_{Best\_LCL}$? 76 | Is $X_{poh}$ less than or equal to $X_L/3$? 77 | Large flaw validation complete? 78 | DOE/POD Analysis Summary and Recommendations 79 |
|---|---|---|---|---|---|---|
| CASE 1 | ● | ● | ● | NA | ● | 90/95 POD at $X_{pod}$ has been reached. Actions: Address any false call warnings. |
| CASE 1+ | ● | ● | ○ | NA | ● | 90/95 POD at $X_{pod}$ has been reached. Actions: Misses above $X_{pod}$ need to be explained and resolved. Address any false call warnings. |
| CASE 1# | ● | ● | ● | NA | ○ | 90/95 POD at $X_{pod}$ has been reached. Actions: Further validation at flaw sizes greater than $X_{pod}$ is required. Add large flaws. Address any false call warnings. |
| CASE 1* | ● | ● | ○ | NA | ○ | 90/95 POD at $X_{pod}$ has been reached. Actions: Further validation at flaw sizes greater than $X_{pod}$ is required. Add large flaws. Misses above $X_{pod}$ need to be explained and resolved. Address any false call warnings. |
| CASE 2 | ● | ● | ○ | NA | NA | 90/95 POD at $X_{pod}$ has been reached, however, there are an excessive number misses above $X_{pod}$. Actions: Additional validation at identified flaw sizes is required. Add flaws per instruction. |
| CASE 4 | ○ | ● | ● | NA | NA | 90/95 POD at $X_{pod}$ has not been reached. Actions: Increase number of flaws at $X$ POH=1 or $X_{Best\_LCL}$. |
| CASE 5 | ○ | ● | ○ | ● | NA | 90/95 POD at $X_{pod}$ has not been reached and there are misses above $X_{Best\_LCL}$. Actions: Increase the number of flaws at $X_{POH=1}$. |
| CASE 6 | ○ | ● | ○ | ○ | NA | 90/95 POD at $X_{pod}$ has not been reached. The POH is fluctuating above $X_{Best\_LCL}$ and $X_{poh}$ is greater than $X_L/3$. The inspection system is unstable for the flaw size range analyzed. Actions: Increase the flaw size range by a factor of two. |
| CASE 7 | ○ | ○ | NA | NA | NA | 90/95 POD at $X_{pod}$ has not been reached. The inspection system is unstable for the entire flaw size range analyzed. Actions: The inspection system may not be appropriate or increase the flaw size range by a factor of two. |
| SURVEY CASES | ○ | ● | NA | NA | NA | The optimized class width exceeds 1/3 XL and $X_{pod}$ has not been reached. The class width optimization has determined that there is a class width for which the smallest $X_{POH=1}$ class length is identified. Actions: Add flaws at survey/ Optimum $X_{POH=1}$. |

Rows CASE 1, CASE 1+, CASE 1#, CASE 1*, CASE 2 = Pass
Rows CASE 4, CASE 5, CASE 6, CASE 7, SURVEY CASES = Fail ● = Yes    ○ = No    NA = Not Applicable

DIRECTED DESIGN OF EXPERIMENTS FOR VALIDATING PROBABILITY OF DETECTION CAPABILITY OF A TESTING SYSTEM

CROSS-REFERENCE TO RELATED APPLICATIONS

This application claims priority to and the benefit of U.S. Provisional Application 61/053,694 filed on May 16, 2008, U.S. Provisional Application 61/109,531 filed on Oct. 30, 2008, and U.S. Provisional Application 61/158,868 filed on Mar. 10, 2009, each of which is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefor.

TECHNICAL FIELD

The present invention relates generally to the validation of a statistics-based testing system, and in particular to a computer-executed process or method that uses directed design of experiments (DOE) to validate the probability of detection (POD) capability of such a testing system.

BACKGROUND OF THE INVENTION

Certain applications may require nondestructive inspection evaluation (NDE) of new or used fracture-critical and/or failure-critical components. For example, in space-based and certain aeronautical applications, there may be elevated concern relating to the use of certain components due to aging and/or impact damage of the components. The presence of one-of-a-kind or few-of-a-kind critical components having a limited inspection history and use, and/or that are constructed of materials having limited availability, has only enhanced the overall inspection concern.

The determination of the capability of conventional inspection systems and methodologies using curve fitting or other techniques may be insufficient for use with updated and rapidly changing inspection requirements for such systems. For example, the National Aeronautics and Space Administration (NASA) currently requires on-orbit inspections of the Space Shuttle Orbiter's external thermal protection system. On-orbit testing is typically performed by trained astronauts as an extravehicular activity (EVA). Inspection of fracture-critical and failure-critical components requires inspection to be at 90% probability of detection (POD) with a 95% level of confidence, commonly referred to in the art and herein as a 90/95 POD.

Design of experiments or DOE describes a statistics-based process in which changes are made to various input variables of a system, and the effects on response variables are measured and recorded. DOE may utilize the concept of "point estimate probability of a hit" or POH at a given "flaw" size, with the term "flaw" referring to a physical flaw such as a crack in a component when used with physical inspection systems. When used with other systems, the term "flaw" may refer to any other variable one wishes to inspect for, e.g., delivery times, flavor levels in a food product, engineering properties, etc.

The determination of estimated POH at a selected flaw size may be a directly measured or observed value between 0 and 1. For a single trial, a "miss" is equal to 0 and a "hit" is equal to 1. Knowledge of an estimated POH yields a measure of the lower confidence bound, or $P_L$. This process is statistically referred to as "observation of occurrences" and is distinct from use of functional forms that predict POD.

Traditionally, binomial distributions have been used for determining POD by direct observation of occurrences. Conventional binomial methodologies use a selection of arrangements for grouping flaws of similar characteristics. These approaches have led to the general acceptance of using the 29 out of 29 (29/29) binomial point estimate method, in combination with validation that the POD is increasing with flaw size, in order to meet certain governmental requirements or standards, e.g., MSFC-STD-1249, NASA-STD-5009, or similar standards.

SUMMARY OF THE INVENTION

Accordingly, a method and an apparatus as set forth herein provide a cost-effective way to validate the detection capability of various inspection or testing systems, with the term "validating" as used herein referring to an approval decision reflecting that the testing system meets a particular inspection requirement or accuracy threshold. The present invention works in binomial applications for POD by adding the concept of a computer-executable lower confidence bound optimization process as the driver for establishing a POD threshold, e.g., a 90/95 POD according to one embodiment, or any other desired POD threshold such as but not limited to 90/99 POD, 80/95 POD, etc., depending on the particular application.

The method and apparatus satisfy the requirement for critical applications where validation of inspection or testing systems, individual procedures, and ultimate qualification of human or robotic operators is required. Additionally, the method and apparatus yield an observed estimate of POD rather than a predicted estimate of POD, with functionality based on the application of the binomial distribution to a set of flaws that are automatically grouped into classes having predetermined widths, i.e., class widths.

The classes are automatically and systematically varied in class width using an automatic iteration process and DOE, with a host machine processing the input data set as described below to determine a data set having an optimal class width. In one embodiment the iteration may start at a minimally sized class width, e.g., approximately 0.001", and change by constant values, e.g., increments of 0.001" up to a maximum expected flaw size. Class width groupings may also start at the largest expected flaws and move toward the smallest expected flaw size. Flaw size may be any flaw dimension such as width, height, depth, volume, shape, etc., when used to describe physical flaws, or another value such as delivery time, flavor level, engineering-quality, etc., for other testing systems not concerned with physical flaws, without departing from the intended scope of the invention.

The largest class length in the first class width group may be assigned as the identifier in the group. The next moving class width group may be identified by decrementing the upper and lower class lengths by the constant value, e.g., 0.001" in one embodiment. The present invention may also require for the purposes of validation that the POD increases with flaw size within the range of flaw sizes for which the results are valid, and may require inclusion of larger flaw sizes in the optimization process as set forth hereinbelow.

The present invention evaluates the lower confidence bound ($P_L$) obtained from any class width group. If the lower confidence bound equals or exceeds 0.90 at any given class width group, there exists a grouping of flaws detected at the desired 90/95 POD or greater level. Otherwise, such a grouping does not exist. As an output or deliverable product, the present invention may provide a detailed set of instructions to a user of the testing system for obtaining the desired POD at a given or an alternate flaw size.

In particular, the present invention provides a method and apparatus for optimizing the lower confidence bound by adjusting the class widths used in the binomial analysis. Once the optimized lower confidence bound is determined, the input data set is identified as a particular case. After determining the case, the test system is either validated to be at the threshold inspection capability or the test system is not validated to be at threshold inspection capability. If the inspection system is not validated to be at the threshold inspection capability then instructions are given, that, when executed successfully, yield an inspection system that is at a threshold inspection capability or an alternate threshold inspection capability, or the inspection system is not capable of demonstrating the threshold inspection capability. Additional validation at the threshold inspection level is performed to assure that the inspection capability is increasing with flaw size, by including a number of large flaws in the sample set. The capability to include other POD data sets to extend the range of validation and to limit the sample requirements to meet geometric needs is included. The false call analysis requiring a minimum specified number of false call opportunities is required to complete all validation and qualifications.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a table describing a set of cases useable by the host machine of FIG. 1.

DESCRIPTION OF THE PREFERRED EMBODIMENTS

Figure 1:
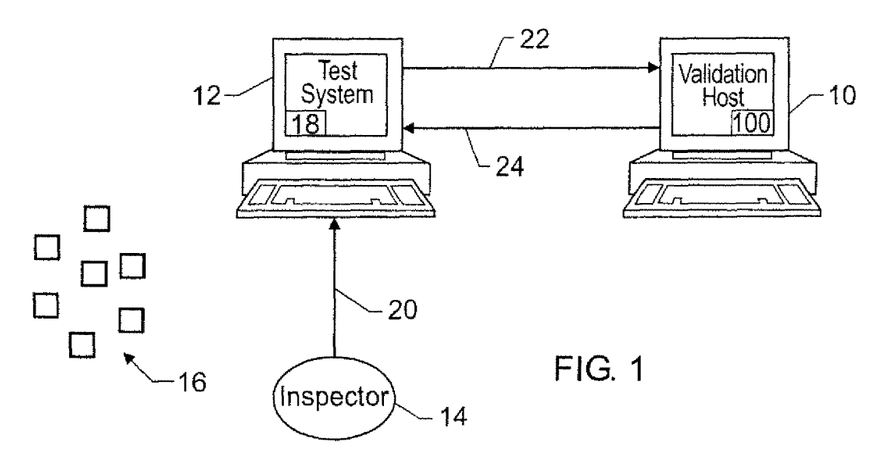
FIG. 1 is a schematic illustration of a host machine configured for validating a test system in accordance with the invention.

Referring to the drawings, wherein like reference numbers represent like components throughout the several figures, and beginning with FIG. 1, a validation host machine 10, hereinafter referred to as the host 10, includes an algorithm 100 suitable for executing a test system validation method as set forth below with reference to FIG. 3. The host 10 may be used in conjunction with a testing system 12 for validating the detection capability of the testing system 12 to a predetermined threshold. e.g., 90/95 POD or another threshold, and if desired, for qualifying an operator or inspector 14 for operation of the testing system 12. In FIG. 1, the testing system 12 is represented as a computer device for simplicity; however, the testing system 12 may include, or may itself be configured as, an inspection procedure, e.g., where an inspector uses liquid penetrants and spray developers with ultraviolet (UV) light and a 10× magnifier, etc.

Testing system 12 may be, according to one embodiment, a non-destructive inspection and evaluation (NDE) inspection system configured for use in the inspection of samples 16. In such an embodiment, the samples 16 may be physical components, and inspection may be performed to identify cracks, pits, chips, or other flaws. Those of ordinary skill in the art will recognize other potential variations of the testing system 12 unrelated to inspection of physical components, e.g., physical delivery or logistical systems, food flavor or other quality sampling, engineering property sampling, etc., that are nevertheless statistical in nature, may also be used within the scope of the invention. However, for simplicity, the inspection of samples 16 in the form of physical components will be described hereinbelow.

The testing system 12 and host 10 may be configured as microprocessor-based devices having such common elements as a microprocessor or CPU, memory including but not limited to: read only memory (ROM), random access memory (RAM), electrically-programmable read-only memory (EPROM), etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry.

An inspector 14, e.g., a human inspector or an automated inspection device or robot, physically inspects each of the samples 16 and records the inspection results 20. Samples 16 may be physical components as noted above such as parts of a space vehicle, platform, aircraft, etc., or anything else to be inspected. The inspection results 20 may describe the observed size of each of the flaws detected by the inspector 14, or the detected amplitude or analog values as noted above. When referring to something other than a physical component, the term "flaws" may describe a predetermined variation from the expected norm.

The testing system 12 includes a calibrated data set 18 of the actual or known flaws contained in components 16. That is, the collective set of samples 16 has known flaws and size distributions. For example, calibrated data set 18 may be determined via direct measurement and/or testing, whether nondestructive or destructive, and recorded in memory within or accessible by the testing system 12. After the data set 18 is recorded, the inspector 14 is provided with the samples 16 and is required to identify each of the known flaws in the components 16.

Figure 2:
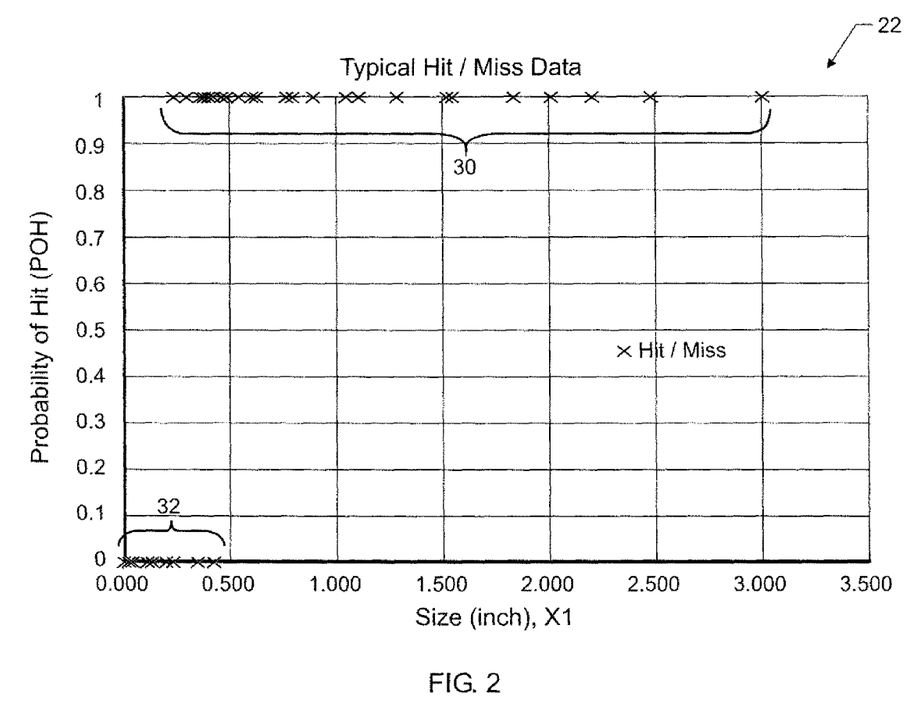
FIG. 2 is a chart describing an input data set of hit/miss data for the test system shown in FIG. 1.

Referring to FIG. 2, once the inspection results 20 are recorded by the testing system 12, the test system may automatically compare the inspection results 20 to the values in the calibrated data set 18 to determine whether a hit or miss is observed for each test. When used to detect physical flaws, flaw length may be the detected value according to one embodiment, and length is therefore used hereinbelow for simplicity even though descriptive values other than length may also be used. Alternately, analog values may be entered by the inspector 14 with the testing system 12 including a threshold, and the testing system 12 or host 10 may compare the results 20 with the threshold to determine the hit/miss results test. The analog threshold may be optimized to provide a tradeoff between optimum POD and false call rates.

The results of this comparison process is an input data set 22 as shown in FIG. 1, which provides a record of observation of each of the various flaws in the samples 16 arranged or organized by flaw size, i.e., the "hits" and "misses". A POH equal to 1 refers to an observed flaw, as generally indicated by the series of "hit" data points 30, while a POH equal to 0 refers to an unobserved flaw or a "miss" as generally indicated by the series of miss data points 32. The testing system 12 may then feed or transmit the input data set 22 to the host 10 for processing therein using DOE as set forth below, and for ultimate validation of the detection capability of the testing system 12 and/or qualification of the inspector 14 by the host 10 using the algorithm 100.

Before referring to FIG. 3, it is noted that binomial distribution may be used in conjunction with the algorithm 100, which will be described below with reference to FIG. 3. Binomial distribution, as will be understood by those of ordinary skill in the art, describes the behavior of a count variable (X) if the following conditions apply: (1) the number of observations (N) is fixed; (2) each observation is independent; (3) each observation represents one of two outcomes, i.e., success or failure, e.g., "Hit" or "Miss", respectively; and (4) the probability of a "Hit", or POH, is the same for each outcome. If conditions 1-4 are met, then X has a binomial distribution.

Various binomial solutions may lead to a 90/95 POD, e.g., a 29/29 binomial solution, a 45/46 binomial solution, a 59/61 binomial solution, etc., as will be understood by those of ordinary skill in the art. In the 59/61 example in particular, beginning with 61 flaws in the group, each flaw has the same probability of being observed as a hit, and 61 observations are ultimately made. If 59 hits are observed then the POH is 59/61, or 0.97, i.e., the observed frequency. This value is only an estimated POH, as the true POH can only be approached by making an infinite number of observations, which is a practical impossibility. The uncertainty in the measurements or the confidence in the POH is another value to be ascertained. The term "confidence level" describes the measure of probability associated with a confidence interval expressing the probability of truth of a statement that the interval will include the parameter value. For NDE applications of the type used in space-based, military, or similar critical applications the confidence bound of interest for POH is the lower confidence bound.

In the example of 90/95 POD, which may be imagined as a bell curve having a 90% lower confidence limit, if the lower limit ($P_L$) is 0.9 there is a 95% chance that the true POH is greater than 90% for that particular flaw size. That is, returning to the 59/61 example, with X=59 hits after N=61 trials, the POH is 59/61 or 0.97 as noted above. The lower confidence bound, or $P_L$, may be obtained using the following statistical equation:

$$P_L = (X)/X + (N - X + 1)F_\alpha(f_1, f_2), \quad (1)$$

where $$F_\alpha(f_1, f_2) = 2.25 \begin{Bmatrix} f_1 = 2(N - X + 1) = 6 \\ f_2 = 2X = 118 \end{Bmatrix}, \quad (2)$$

$P_L$=0.9, and $\alpha$ is, a priori, the confidence level of 95% required of the function $F_\alpha(f_1, f_2)$ which may be obtained from an F-distribution statistical table. Note that the POH does not change if the confidence level is changed. This confidence bound procedure has a probability of at least 0.95 to give a lower bound for the 90% POD point that exceeds a true but still unknown 90% POD point.

Figure 3:
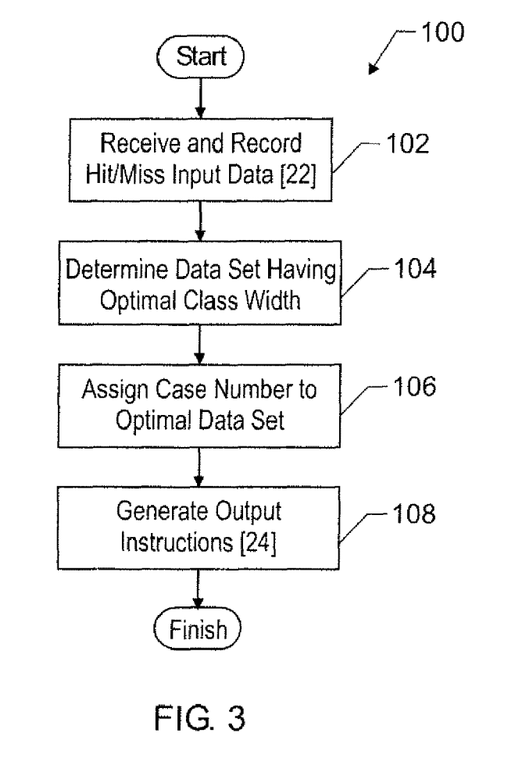
FIG. 3 is a flow chart describing a method that may be executed using the host machine shown in FIG. 1.

Referring to FIG. 3, the host 10 of FIG. 1 is configured for executing the algorithm 100 to thereby qualitatively evaluate the POD capability of a statistics-based test system such as the testing system 12, which in one embodiment may be configured as an NDE system as noted previously hereinabove. That is, host 10 provides validation of testing that demonstrates whether the identification of $X_{POD}$, i.e., the 90/95 POD flaw size, without false call or large flaw warnings as explained below, and with explanation and resolution of any misses above $X_{POD}$, qualifies that the inspection system performs adequately, and that there is 95% confidence that the POD is greater than 90% (90/95 POD) at and above $X_{POD}$.

Beginning with step 102, host 10 receives and records the set of input data 22 from the testing system 12. Input data 22 may be the hit/miss data shown in FIG. 2, but may also be analog input data having a threshold value. For example, the inspector 14 may be told to record an ultrasonic signal amplitude of 0.5V, 1V, 2V, 3V, etc. and any amplitudes greater than a calibrated threshold, e.g., 2V, may be identified by the host 10 as being "hits", with all other values being "misses".

Step 102 may also include performing false call analysis, and recording the results of the false call analysis. As will be understood in the art, false call analysis involves providing flawless samples to an inspector 14. When the inspector 14 finds a flaw that is not actually present, this result is referred to as a false call, and is much akin to a radiologist reading an X-ray film and finding an abnormality when none is present, i.e., a false positive. Statistically, at least 84 false call samples or false call inspection opportunities should be provided and the results recorded in a memory location accessible by the host 10 to ensure proper validation results. After completing step 102, the algorithm 100 proceeds to step 104.

Figure 4:
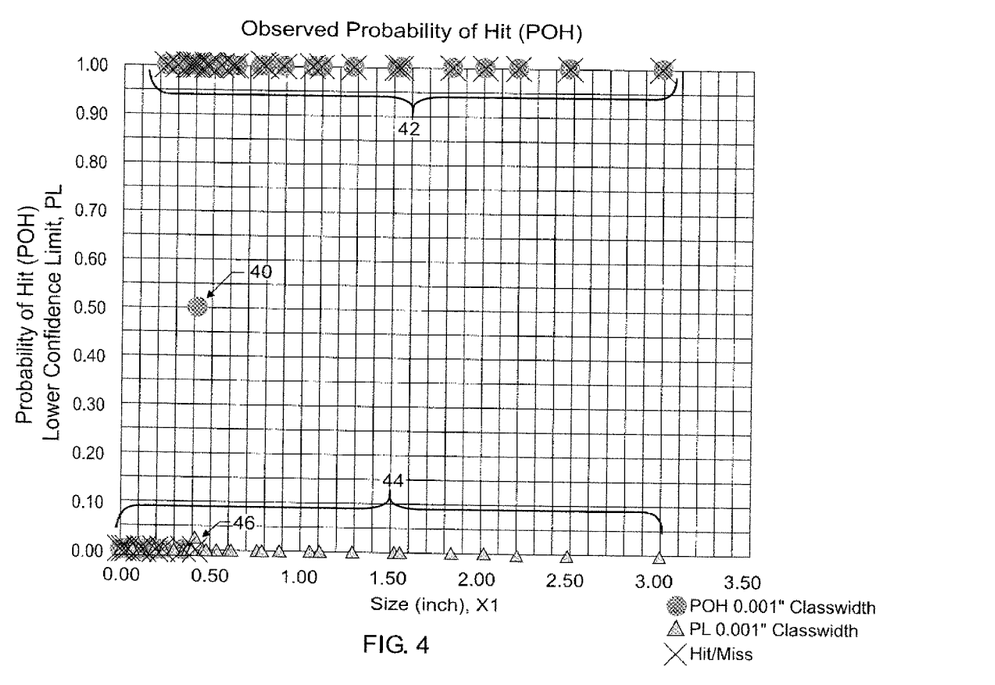
FIG. 4 is a chart describing an initial set of observed probability of hit (POH) data.

At step 104, the host 10 processes the input data set 22 to determine an optimal class width. Generally, the host 10 automatically groups similar size flaws together to optimize the class width to identify the optimum lower confidence bound. Referring briefly to FIG. 4, in a first iteration having a class width of 0.001" the processed input data set 22 appears with almost all of the POH data points 42 having a 100% POH, with one data point 40 having a 50% POH. The lower confidence limit ($P_L$) is also plotted at 44. Note that the data point having the highest $P_L$, i.e., point 46, has a confidence bound of less than 5%. The class width of the data set represented in FIG. 4 is therefore less than optimal.

Figure 5:
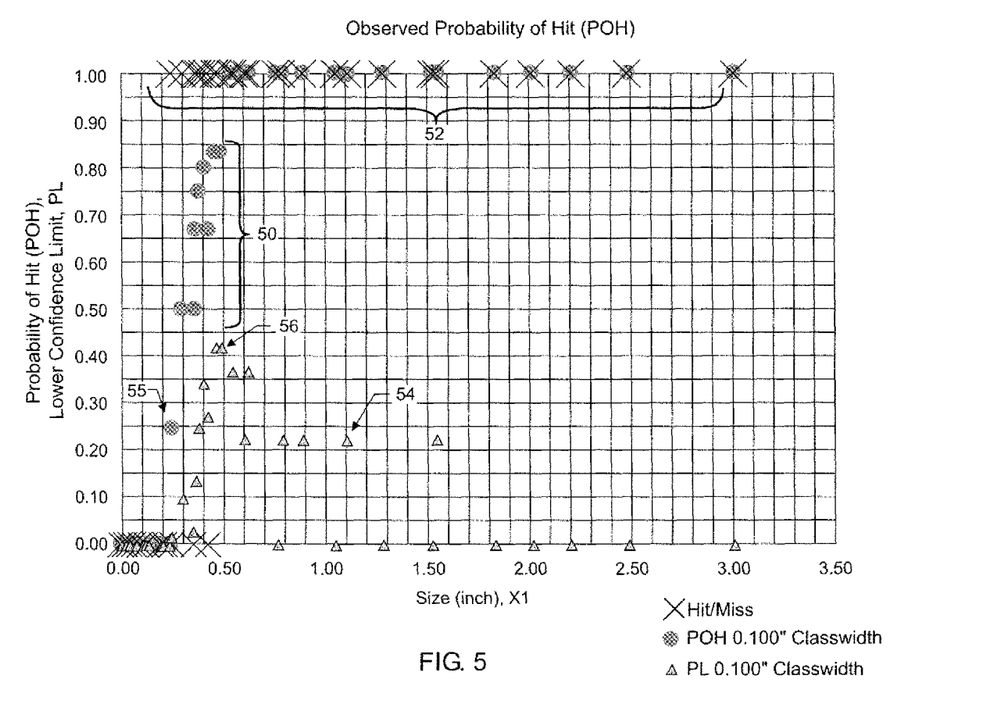
FIG. 5 is a chart describing a partially optimized set of observed POH data.

Referring to FIG. 5, after numerous iterations that change the class width from 0.001" in FIG. 4 to a more optimal class width of 0.100" in FIG. 5, data points 52 have a 100% POH, data points 50 have a POH of between 85% and 50%, and one data point 55 has a POH of 25%. However, the highest $P_L$ of the data points 56 is approximately 42.5%. While vastly improved from the confidence bound value of 5% of data point 46 in FIG. 4, the highest confidence remains a far cry from the required 90/95 level in this example. Further iterations are therefore required, again with each successive iteration increasing the class width by predetermined constant values, e.g., 0.001". Alternately, class widths may be allowed to vary in size as part of the optimization process rather than applying constant values, which may provide a more rapid response. With each iteration, note that the intermediate data sets such as those shown in FIGS. 4 and 5 are recorded in memory of the host 10, as the optimal class width configuration may not be discernable by the host 10 until each iteration is completed out to the largest expected flaw size. That is, increases in class width do not necessarily lead to a more optimal class width.

Referring again to FIG. 3, step 104 may also require the inclusion of a predetermined number of "large" flaws for proper validation of the testing system 12. While the assumption that a testing system accurately detecting a smaller flaw will naturally detect a larger flaw, the reality may be quite different. Statistically, at least 29 similar flaws are required at the target flaw size for supporting validation of certain existing test systems, e.g., conventional NDE systems, while at least 25 additional large flaws uniformly distributed between the target flaw size and the largest expected flaw size are required for validating new systems, i.e., to ensure that 90/95 POD is provided for the large flaws.

Figure 6:
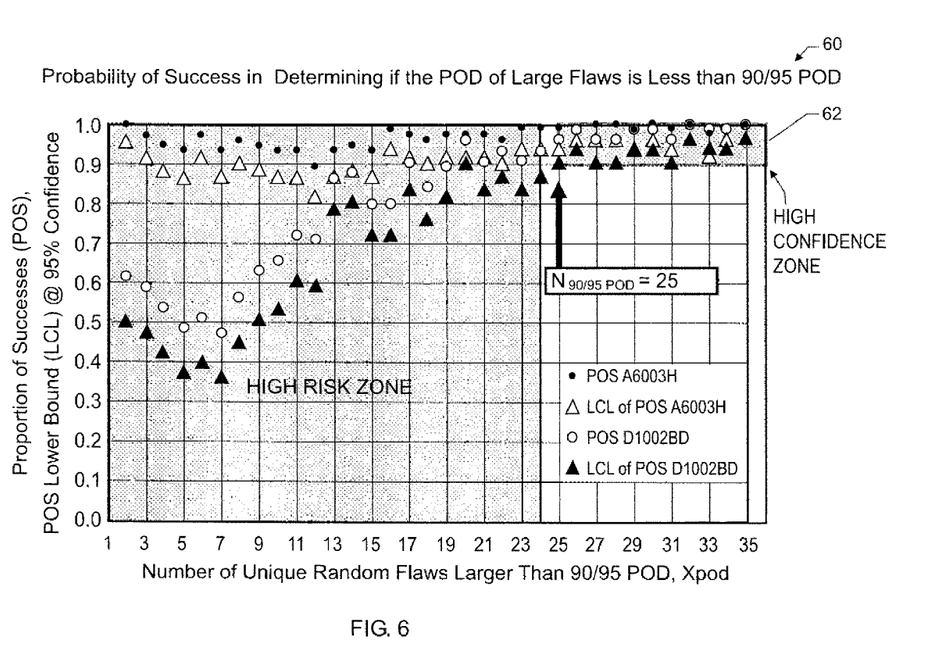
FIG. 6 is a chart describing a probability of success in determining if the POD of large flaws is less than 90/95 POD in an exemplary embodiment.

Referring briefly to FIG. 6, table 60 shows the origin of the statistical threshold of 25 large flaws as noted above. Note that until at least 25 large flaws are included in the analysis, the LCL remains below 0.90. A high confidence zone 62 is achieved at or above 25 large flaw samples. To ensure the integrity of the validation process, therefore, at least 25 large flaws should always be included in the output data set 22.

Referring again to FIG. 3, once the optimal class width is determined at step 104 the algorithm 100 proceeds to step 106.

At step 106, one of a plurality of predetermined case numbers is assigned to the optimal data set. Referring briefly to FIG. 7, a table 70 presents a representative set of such cases 72. In column 74, the table 70 records whether or not 90/95 POD is reached at $X_{POD}$, i.e., whether the lower confidence bound is equal to or greater than 0.9. Column 75 may record whether there is a class length, $X_{POH}$, for which POH is equal to 1 (100%) everywhere greater than $X_{POH}$. Class length describes a point or length at which a particular class width is attached, e.g., a class width of 0.10" that may contain all flaws ranging from 0.9" to the 1" class length or flaw size. Column 76 records whether POH is equal to 1 (100%) everywhere greater than the class length with the optimal lower confidence bound. Column 77 records whether $X_{POH}$ is less than or equal to $X_L/3$, where $X_L$ describes the largest flaw in the data set. Column 78 records whether large flaw validation is complete.

Finally, column 79 provides a detailed analysis and recommendations for validating the testing system 12 when the assigned case from column 72 results in a failed validation. For example, in the example shown in FIG. 7 cases 1 and 1+ reflect passing validations. Column 79 entries for each of cases 1 and 1+ therefore reports that: (a) 90/95 POD has been reached, which is the goal of the validation effort; (b) false call warning should be addressed, if any; and (c) any other actions that should be resolved.

Cases 1 through 7 and the survey case represent a failed validation. Rather than simply failing, however, the algorithm 100 and host 10 provide a detailed report to a user of the system 12 on the precise steps needed for achieving a passing result, e.g., cases 1 and 1+. While table 70 provides one possible tabular solution, those of ordinary skill in the art will recognize that other tables may be used, with different case numbering and total case numbers, depending on the particular design of the host 10.

Referring again to FIG. 3, after assigning the case number at step 104, the algorithm 100 generates output instructions 24, which may be transmitted or otherwise provided to the testing system 12 or a user thereof. Instructions 24 may be a detailed report of findings including the precise recommendations from column 79 of the table 70 of FIG. 7. The instructions 24 may be displayed by the host 10, printed as a deliverable report by the host 10, or transmitted or delivered in a digital format for display and/or printing as desired by a user of testing system 12. Using the instructions 24, a user of a failed testing system may follow the instructions 24 and repeat the validation testing until the testing system 12 is validated at the 90/95 POD level or there are recommendations that the testing system 12 will not ever meet threshold inspection requirements. The algorithm 100 is then finished.

While 90/95 POD is referred to throughout, the actual POD requirement may vary without departing from the intended scope of the invention. For example, while 90/95 POD is expected for certain critical applications, e.g., space and aeronautic applications, for other applications different POD thresholds such as 90/99 or 80/95 may be more appropriate. The apparatus and method of the invention are equally well suited to validating testing system 12 of FIG. 1 to POD requirements other than 90/95 POD. Likewise, the term POD as used herein refers to the embodiment used for inspection of physical components for flaws such as cracks or fractures. The apparatus and method may also be used to determine the probability of a non-detection result, such as probability of on-time delivery of a package when used with a logistical testing system. In this case the term POD may be replaced by an appropriate term, with the operation of the apparatus and method otherwise being substantially as set forth above.

The present invention is further discussed in Generazio, Edward R., Directed Design of Experiments (DOE) for Determining Probability of Detection (POD) Capability of NDE Systems (DOEPOD), 34th Annual Review of Progress in Quantitative Nondestructive Evaluation (QNDE 2007), presentation, July 2007; Generazio, Edward R., Directed Design of Experiments for Validating Probability of Detection Capability of NDE Systems (DOEPOD), AIP Conference Proceedings, 2008, Volume 975, pp. 1693-1700; and Generazio, Edward R., Directed Design of Experiments (DOE) for Determining Probability of Detection (POD) Capability of NDE Systems (DOEPOD), 50th Annual Air Transportation Association (ATA) Non-Destructive Testing (NDT) Forum, presentation, August 2007; all incorporated herein by reference in their entirety.

While the best modes for carrying out the invention have been described in detail, those familiar with the art to which this invention relates will recognize various alternative designs and embodiments for practicing the invention within the scope of the appended claims.

What is claimed as new and desired to be secured by Letters Patent of the United States is:

1. A method of validating the performance of a statistical testing system using directed design of experiments (DOE), the method comprising:
   recording an input data set in a memory location that is accessible by a host machine, wherein the input data set describes a set of observed probability of hit (POH) data for a plurality of samples as a function of a characteristic of the samples;
   processing the input data set using the host machine to thereby generate an output data set having an optimal class width;
   assigning a case number to the output data set; and
   generating a set of instructions using the assigned case number;
   wherein the instructions validate the performance of the testing system when the assigned case number equals a predetermined case number, and wherein the instructions inform a user of the testing system regarding required steps for validating the testing system when the assigned case number does not equal the predetermined case number.

2. The method of claim 1, wherein recording an input data set includes recording a flaw in the samples as the characteristic.

3. The method of claim 1, including using a processor to automatically calculate a lower confidence bound using the POH data, and recording the lower confidence bound using the host machine for use in processing the input data set.

4. The method of claim 1, wherein processing the input data set continues until a threshold POD and a lower confidence bound is reached for all samples within a given class width.

5. The method of claim 1, wherein processing the input data set includes generating a first intermediate data set for a first class width, increasing the size of the first class width by a constant value to produce a second class width, and then generating an additional intermediate data set for each of a plurality of different class widths.

6. The method of claim 1, wherein recording the input data set includes recording the results of a false call analysis procedure of a calibrated number of false call samples.

7. A method of validating a probability of detection (POD) testing system, the method comprising:
recording an input data set in a memory location accessible by a host machine, the input data set describing a set of observed data for a plurality of sample components as a function of size of a flaw in the sample components;
using the host machine to generate an output data set having an optimal class width, wherein the host machine generates the output data set using an algorithm that automatically processes the input data set through multiple class width iterations using directed design of experiments (DOE);
selecting a case number from a plurality of predetermined cases using the output data set having the optimal class width; and
generating a set of instructions based on the selected case, including at least one of displaying the set of instructions on a display screen, transmitting an electronic copy of the instructions to a remote system, and printing a report;
wherein the content of the instructions corresponds to the selected case number and validates the testing system only when the selected case is equal to a predetermined ease number.

8. The method of claim 7, wherein the set of observed data is at least one of: a set of hit and miss data, a set of analog data with a corresponding threshold, and a set of false call data.

9. The method of claim 7, wherein using a host machine to generate an output data set having an optimal class width includes using a binomial solution to generate a data set having a POD that is a 90/95 POD.

10. The method of claim 7, further comprising:
receiving a second input data set using the host machine; and
processing the second input data set using the host machine to determine the output data set;
wherein the second input data set is an additional set of POD data that is generated by one of the testing system and a device that is external to the testing machine.

11. The method of claim 7, further comprising:
recording a dimensional limitation of the components; and
automatically limiting the number of tests required at large class lengths using the dimensional limitation.

12. The method of claim 7, wherein recording the input data set includes recording the results of a false call analysis procedure of at least 84 false call samples or false call test opportunities.

13. The method of claim 7, wherein using a host machine to generate an output data set having an optimal class width includes processing at least 25 large flaws, wherein the large flaws are flaws that are uniformly distributed between a target flaw size ($X_{POD}$) of the optimal class width and the largest expected flaw size.

14. An apparatus adapted for validating the probability of detection (POD) capability of a statistics-based testing system, the apparatus comprising:
a host machine having a processor and a memory location, wherein the host machine in communication with the testing system and adapted for receiving an input data set from the testing system and recording the input data set in the memory location, and wherein the input data set describes a set of observed probability of hit (POH) data for a plurality of sample components as a function of size of a flaw in the components; and
an algorithm for applying a directed design of experiments (DOE) to the input data set to thereby validate the performance of the testing system;
wherein the algorithm is executed via the processor to:
apply the DOE to the input data set to determine a data set having an optimal class width;
assign a case number to the data set having the optimal class width; and
generate a set of instructions having a validation result that is based on the case number.

15. The apparatus of claim 14, wherein the testing system is configured as a non-destructive evaluation inspection (NDE).

16. The apparatus of claim 14, wherein the set of instructions includes detailed steps describing how a user of the testing system may achieve a passing validation result for the testing system.

17. The apparatus of claim 16, wherein the set of instructions includes detailed steps describing how to qualify an inspector for use of the testing system once the testing system has been validated.

18. The apparatus of claim 14, wherein the algorithm determines the optimal class width by iterating the class width by predetermined constant values starting with a minimum class width and continuing to a maximum expected flaw size, and by selecting the data set having a threshold POD for all samples within that particular class width.

* * * * *